United States Patent [19]
Carey et al.

[11] Patent Number: 6,006,214
[45] Date of Patent: *Dec. 21, 1999

[54] DATABASE MANAGEMENT SYSTEM, METHOD, AND PROGRAM FOR PROVIDING QUERY REWRITE TRANSFORMATIONS FOR NESTED SET ELIMINATION IN DATABASE VIEWS

[75] Inventors: Michael J. Carey; Gerald George Kiernan, both of San Jose, Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/760,059

[22] Filed: Dec. 4, 1996

[51] Int. Cl.$^6$ ..................................................... G06F 17/30
[52] U.S. Cl. ................................................. 707/2; 707/103
[58] Field of Search .......................... 707/1–4, 100–103

[56] References Cited

U.S. PATENT DOCUMENTS

| | | | |
|---|---|---|---|
| 5,659,725 | 8/1997 | Levy et al. ................................... | 707/1 |
| 5,713,015 | 1/1998 | Goel et al. ................................... | 707/4 |
| 5,724,570 | 3/1998 | Zeller et al. ................................. | 707/3 |
| 5,774,692 | 10/1995 | Boyer et al. .............................. | 395/500 |

OTHER PUBLICATIONS

"Performing Group–By before Join," Yan et al., Proceedings o fteh 10th International Conference on Data Engineering, USA, pp. 89–100, IEEE, Feb. 1994.

The Committee for Advanced DBMS Function. "Third–Generation Database System Manifesto", SIGMOD Record, vol. 19, No. 3, Sep. 1990, pp. 31–44.

Kim, W., "Object–Oriented Database Systems: Promises, Reality, and Future", Proceedings of the 19$^{th}$ International Conference on Very Large Data Bases, Aug. 24–27, 1993, Dublin, Ireland; Agrawal, R. et al., Editors; pp. 676–687.

Carey, M.J. et al., A Data Model and Query Language for EXODUS', Proceedings SIGMOD International Conference on Management of Data, Chicago, Illinois, Jun. 1–3, 1988, ACM Press, SIGMOD Record, vol. 17, No. 3, Sep. 1988, pp. 413–423.

Kim, W., "A Model of Queries for Object–Oriented Databases", Proceedings of the Fifteenth International Conference on Very Large Data Bases, Aug. 22–25, 1989, Amsterdam. The Netherlands; Apers, P.M.G. et al., Editors; pp. 423–432.

(List continued on next page.)

*Primary Examiner*—Thomas G. Black
*Assistant Examiner*—Hosain T. Alam
*Attorney, Agent, or Firm*—Gates & Cooper

[57] ABSTRACT

The system, method, and program of this invention, referred to herein as nest elimination, performs query rewrite transformations, within a database management system (DBMS), for a certain class of object queries over views that involve derived nested sets. The nest elimination algorithm uses query rewriting to avoid computing these nested sets in certain common cases. For each quantifier in a query (if the quantifier is defined over a nested set that is a part of a view or if the quantifier is implemented by a subquery that projects a NEST aggregate) the following functions are performed: a) resetting an element to which a quantifier is bound in the database query to an argument of a nest aggregate function in a nest subquery of a view; b) adding a null testing predicate to the rewritten database query; c) adding quantifiers defined within the nest subquery to the rewritten database query; d) adding predicates from the nest subquery of the view to the rewritten database query; and e) rewriting each expression involving a quantifier over an instance into a path expression. The resulting rewritten query is then further processed by the DBMS such as through a query optimizer, etc. By avoiding nested set computations for a certain class of queries, the rewritten query can result in improved processing performance.

25 Claims, 5 Drawing Sheets

OTHER PUBLICATIONS

Bancilhon, F. et al., "A Query Language for the $O_2$ Object-Oriented Database System", Proceedings of the $2^{nd}$ International Workshop on Database Programming Languages, Gleneden Beach, Oregon, 1989; Hull, R. et al., Editors; 1990 Morgan Kaufmann Publishers, Inc., pp. 122–138.

Orenstein, J. et al., "Query Processing in the ObjectStore Database System", Proceedings of the 1992 ACM SIGMOD International Conference on Management of Data, San Diego, California, Jun. 2–5, 1992, SIGMOD Record, vol. 21, Issue 2, Jun. 1992; Stonebraker, M., Editor; 1992 ACM, pp. 403–412.

Dar., S. et al., "CQL++:A SQL for the Ode Object–Oriented DBMS", Proceedings of the $3^{rd}$ International Conference on Extending Database Technology, Advances in Database Technology—EDBT '92; Lecture Notes in Computer Science; Vienna, Austria, Mar. 1992, Pirotte, A. et al., Editors; 1992 Springer–Verlag Berlin Heidelberg, pp. 201–216.

Kifer, M. et al, "Querying Object–Oriented Databases", Proceeding of the 1992 SIGMOD International Conference on Management of Data, San Diego, California, Jun. 2–5, 1992, SIGMOD Record, vol. 21, Issue 2, Jun., 1992; Stonebraker, M., Editor; ACM Press, pp. 393–402.

Atwood, T. et al., "Object Query Language", The Object Database Standards ODMG–93, Release 1.1; Cattell, R.G.G., Editor, 1993 Morgan Kaufmann Publishers, pp. 65–81.

Blakeley, J.A. et al., "Experiences Building the Open OODB Query Optimizer", Proceedings of the 1993 ACM SIGMOD International Conference on Management of Data, SIGMOD '93, Washington, D.C., May 26–28, 1993; Buneman, P. et al., Editors; SIGMOD Record, vol. 22, Issue 2, Jun. 1993, ACM Press, pp. 287–296.

Kim., W., "Observations on the ODMG–93 Proposal for an Object–Oriented Database Language", SIGMOD Record, vol. 23, No. 1, Mar. 1994.

Pirahesh, H. et al, "Extensible/Rule Based Query Rewrite Optimization in Starburst", Proceeding of the 1992 SIGMOD International Conference on Management of Data, San Diego, California, Jun. 2–5, 1992, SIGMOD Record, vol. 21, Issue 2, Jun., 1992; Stonebraker, M., Editor; ACM Press, pp. 39–48.

Murnick, I.S. et al., "Magic is Relevant", Proceedings of the 1990 ACM SIGMOD International Conference on Management of Data, May 23–25, 1990, Atlantic City, New Jersey; Garcia–Molina, H. et al., Editors: 1990 ACM, pp. 247–258.

Murnick, I.S. et al, "The Magic of Duplicates and Aggregates" Proceedings of the 16th International Conference on Very Large Databases, Aug. 13–16, 1990, Brisbane, Australia; McLeod, D. et al., Editors; pp. 264–277.

Cluer, S. et al., "A General Framework for the Optimization of Object–Oriented Queries", Proceedings of the 1992 SIGMOD International Conference on Management of Data, San Diego, California, Jun. 2–5, 1992, SIGMOD Record, vol. 21, Issue 2, Jun., 1992; Stonebraker, M., Editor; ACM Press, pp. 383–392.

Object Management Group, "Object Services RFP 4", OMG TC Document 94–4–18, May 11, 1994.

IBM Corporation Itasca, Objectivity, Inc., Ontos, O2, Servio, SunSoft, Inc., Sybase, Inc., and Taligent, Inc.; Joint Submission, "Object Query Service Specification", OMG TC Document 95.1.1, Jan. 4, 1995.

ISO–ANSI, Working Draft, "Information Technology–Database Language SQL", Jim Melton, Editor, International Organization for Standardization and American National Standards Institute, Jul. 1992.

Microsoft Corporation, "ODBC 2.0 Programmer's Reference and SDK Guide. The Microsoft Open Database Standard for Microsoft Windows™ and Windows NT™, Microsoft Open Database Connectivity™ Software Development Kit", 1992, 1993, 1994 Microsoft Press, pp. 3–30 and 41–56.

ISO Working Draft, "Database Language SQL–Part 2:Foundation (SQL/Foundation)", CD9075–2:199χSQL, Sep. 11, 1997, ISO/IECJTC1/SC21N11106 – DBL:???–002, Table of Contents, Section 6.7 <field reference>, and Section 6.8 <monadic function reference>.

Kiernan, J. et al., "Extending SQL–92 for OODB Access: Design and Implementation Experience", Proceedings of the Conference on Object–Oriented Programming Systems '95, Austin, Texas, 1995 ACM, pp. 467–480.

```
            101       102         103              104
            ⌒        ⌒          ⌒              ⌒
   create view DeptView (dno integer, dname character,
                                        ⌒─────105
                              dspouses Collection<person*>)
                                                        ⌒───107
   as (select d.no, d.name, (select nest (e.spouse)
                              108 ⌐              106
                    109 ⌐ from (d.emps) e ⌐
                                 ⌐111 ⌐112
                    114 ⌐ where e.spouse..age < 25)⌐───113 from Dept d)
```

FIG. 1

```
201 ── for each quantifier q in the FROM clause do
        begin
203 ──── if q is defined over a nested set that is part of a view do
          begin
            if q is implemented by a subquery that projects a NEST
205 ──────── aggregate
              begin
208 ──────────(1) set the column to which q is bound to the argument
                  of the NEST aggregate
210 ──────────(2) add a null testing predicate to eliminate instances
                  of the set that would otherwise be bound to null
                  values
213 ──────────(3) add the quantifiers defined within the nest subquery
                  to those of the query that is being rewritten
215 ──────────(4) add the predicates from the view's nest subquery
                  to those of the query that is being rewritten
217 ──────────(5) rewrite all expressions that involve quantifiers
                  over instances into path expressions (these are
                  quantifiers that currently range over single objects
                  instead of collections of objects)
              end
          end
        end
```

DATABASE MANAGEMENT SYSTEM, METHOD, AND PROGRAM FOR PROVIDING QUERY REWRITE TRANSFORMATIONS FOR NESTED SET ELIMINATION IN DATABASE VIEWS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to systems, methods, and computer programs in the field of processing database queries in database management systems (DBMSs) including relational, hierarchical, and object-oriented DBMSs, and more specifically to query rewrite transformation techniques for a certain class of queries that unnest a nested collection of objects in a database system.

2. Description of the Related Art

Databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives for semi-permanent storage.

A DBMS is structured to accept commands to store, retrieve, and delete data. One widely used and well known set of commands is called the Structured Query Language (SQL). The current SQL standard is known informally as SQL/92. The definitions for SQL provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. The DBMS will optimize the method used to find the data requested in a query in order to minimize the computer time used and, therefore, the cost of doing the query.

In object-oriented databases (OODB), the database is organized into objects having members that can be pointers to other objects. An object can have parent-child hierarchical relationships. The objects contain references, and collections of references, to other objects in the database, thus leading to databases with complex nested structures.

The integration of object technology and database systems has been an active area of research for the past decade. One important aspect of the integration of these two technologies is the provision of efficient, declarative query interfaces for accessing and manipulating object data. Compared to other aspects of object-oriented database (OODB) technology, such as integrating persistence into object-oriented languages like C++ and Smalltalk, queries were given relatively little attention in the early days of OODB research. See "Third Generation Data Base System Manifesto, Mike Stonebraker, *Computer Standards & Interfaces,* 12, December 1991. In "Object-Oriented Database Systems: Promise, Reality, and Future," Won Kim, *Proc. 19th International Conference on Very Large Data Bases,* Dublin, August 1993, it is pointed out that even today, a number of commercial OODB systems are quite weak in this regard. As the OODB field has developed, however, a number of proposals for OODB query languages have appeared in the database literature including the following:

"A Data Model and Query Language for EXODUS," *Proc. ACM-SIGMOD International Conference on Management of Data,* Carey, Mike; DeWitt, David; Vandenberg, Scott; Chicago, June 1988.

"A Model of Queries for Object-Oriented Databases," Kim, Won; *Proc. 15th International Conference on Very Large Data Basses,* Amsterdam, August 1989.

"A Query Language for the $O_2$ Object-Oriented Database System," Bancilhon, Francois; Cluet, S.; Delobel, C.; *Proc. 2nd International Workshop on Database Programming Languages,* Hull, Richard; Morrison, Ron; Stemple, David, editors; Gleneden Beach, June 1989, Morgan-Kaufmann Publishers, Inc.

"Query Processing in the ObjectStore Database System," Orenstein, Jack; Haradhvala, Sam; Margulies, Benson; Sakahara, Don; *Proc. ACM-SIGMOD International Conference on Management of Data,* San Diego, June 1992.

"CQL++: A SQL for a C++ Based Object-Oriented DBMS," Dar, S.; Gehani, N.; Jagadish, H.; *Proc International Conference on Extending Data Base Technology,* Advances in Database Technology - EDBT '92. Lecture Notes in Computer Science, Vienna, 1992. Springer-Verlag.

"Querying Object-Oriented Databases," Kifer, Michael; Kim, Won; Sagiv, Yehoshua; *Proc. ACM-SIGMOD International Conference on Management of Data,* San Diego, June 1992.

"Object Query Language," Atwood, Tom; Duhl, Joshua; Ferran, Guy; Loomis, Mary; Wade, Drew; *Object Database Standards: ODMG - 93 Release 1.1,* R. G. G. Cattell, editor, Morgan-Kaufmann Publishers, Inc., 1993.

"Experiences building the open oodb query optimizer," Blakeley, José; McKenna, William J.; Graefe, Goetz, *Proc. ACM SIGMOD International Conference on Management of Data,* Washington, D.C., May 1993.

While proposals outnumber actual implementations, several of these language designs have indeed been implemented as the query interfaces for significant commercial OODB products. See, "A Query Language for the $O_2$ Object-Oriented Database System," Bancilhon, Francois; Cluet, S.; Delobel, C.; *Proc. 2nd International Workshop on Database Programming Languages,* Hull, Richard; Morrison, Ron; Stemple, David, editors; Gleneden Beach, June 1989, Morgan-Kaufmann Publishers, Inc. See also, "Query Processing in the ObjectStore Database System," Orenstein, Jack; Haradhvala, Sam; Margulies, Benson; Sakahara, Don; *Proc. ACM-SIGMOD International Conference on Management of Data,* San Diego, June 1992.

The commercial OODB systems that are generally considered to have the best object query facilities are O2 and ObjectStore. (ObjectStore is a trademark of Object Design, Inc.) Each provide their own flavor of an object query language. ObjectStore's query language is an extension to the expression syntax of C++. O2's query language is generally more SQL-like, and has been adapted into a proposed OODB query language standard (OODMG-93) by a consortium of OODB system vendors, but it differs from SQL in a number of respects. (See, "Object Query Language," Atwood, T.; Duhl, J.; Ferran, G.; Loomis, M.; and Wade, D.; *Object Database Standards:ODMG*-93 Release 1.1, Cattell, R. G. G., editor, Morgan-Kaufmann Publishers, Inc., 1993; and "Observations on the ODMG-93 Proposal," Kim, W., *ACM SIGMOD Record*, 23(1), March 1994.)

Furthermore, it should be noted that SQL has object relational queries, and Illustra Relational Database System has object oriented features in it.

As with any database management system such as object-oriented or relational, query rewrite transformations and system-managed query optimization are essential features to ensure acceptable query performance. Query rewrite transformations for optimizing queries have been developed previously for relational DBMSs. See "Extensible/Rule Based Query Rewrite Optimization in Starburst," Hamid Pirahesh, Joseph M. Hellerstein, and Waqar Hasan, In *Proc. ACM-SIGMOD International Conference on Management of Data*, San Diego, June 1992; "Magic is Relevant," Inderpal Singh Mumick, Sheldon J. Finkelstein, Hamid Pirahesh, and Raghu Ramakrishnan, In *Proc. ACM-SIGMOD International Conference on Management of Data*, pages 247–258, Atlantic City, May 1990; and "The Magic of Duplicates and Aggregates," Inderpal Singh Mumick, Hamid Pirahesh, and Raghu Ramakrishnan, In *Proc. 16th International Conference on Very Large Data Bases*, Brisbane, August 1990. Many of these transformations also apply for Object Query Systems. However, new query rewrite transformations that apply specifically to Object Query Systems still need to be developed. See "A General Framework for the Optimization of Object-Oriented Queries," Sophie Cluet and Claude Delobel, In *Proc. ACM-SIGMOD International Conference on Management of Data*, San Diego, June 1992.

A query can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across multiple tables.

Object oriented (OO) views provide a similar service for object data as relational views do for relational data. An OO view is an alternative way of looking at data in objects contained in one or more queryable collections. An OO view is a named specification of a virtual result collection. Similarly to relational views, the bodies of OO views are queries that declaratively specify the contents of the view. In contrast with relational schemas, OO schemas are defined with a rich set of types that include multivalued attributes such as collections. These types directly model hierarchical and many-to-many relationships in the application's schema. For example, a department has a set of employees, an employee has a set of children, and so on.

In some cases, an application schema designer might wish to define an OO view having a data member that is a nested collection of objects, while the underlying data over which the view is derived has no nested collections. The embedded collection is then created using a "nest" operation in the query that implements the view's multi-valued data member. However, there can be a significant performance penalty in computing nested collections.

SUMMARY OF THE INVENTION

It is therefore an object of this invention to minimize any degradation in query processing performance by avoiding nested collection computations for those queries over views containing a nested collection, but where the results of the query do not contain a nested collection.

The invention presented herein is in the framework of an OMG compliant (See "OMG. Object Services Request for Proposals," *OMG TC Document* 94.4.18, 1994; and "OMG. Object Query Service Specification, Joint Submission," *OMG TC Document* 95.1.1, 1995) Object Query Service which is based upon SQL queries and other technology for handling the requirements of object technology. Although the preferred embodiment is described in relation to an object oriented database system, the invention is applicable to other database systems including relational and hierarchical database systems.

The system, method and program of this invention provides a query rewrite transformation process, called "nest elimination", to handle queries over views with computed nested data members. More specifically, the preferred embodiment performs the query rewrite transformations for a certain class of Object Queries over views that involve derived nested sets. Using a query rewrite transformation eliminates the need to compute nested collections for a large class of queries over such views. This can lead to a query processing performance gain for such queries.

For queries that do not reference a nested collection, the subquery that implements the nested collection is dropped by the query rewrite transformation. For queries that reference a nested collection in the projection list, the nested set is implied to be part of the result of the query and must be computed. For queries that unnest a nested collection, the nested set computation is eliminated by rewriting the query as further described.

For each quantifier in a query (if the quantifier is defined over a nested set that is a part of a view or if the quantifier is implemented by a subquery that projects a NEST aggregate) the following functions are performed: a) resetting an element to which a quantifier is bound in the database query to an argument of a nest aggregate function in a nest subquery of a view; b) adding a null testing predicate to the rewritten database query; c) adding quantifiers defined within the nest subquery to the rewritten database query; d) adding predicates from the nest subquery of the view to the rewritten database query; and e) rewriting each expression involving a quantifier over an instance into a path expression.

The resulting rewritten query is then further processed by the DBMS such as through a query optimizer, etc. By avoiding nested set computations for a certain class of queries, the rewritten query can result in improved processing performance.

While the preferred embodiment of this invention is described herein in terms of a specific view definition language, the invention is applicable to similar views over any object model that supports nested collections of objects and permits such collections to appear in views.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

An explanation of some of the terminology used herein is provided below. Although the following definitions are described using terminology applicable to relational databases (e.g., tables, columns, rows, attributes) the terminology is applicable to other systems (e.g., object-oriented or hierarchical systems and databases) by substituting the appropriate corresponding entity. For example, the terms "table," "view (either an OO view or relational view)", object, or a queryable collection of objects can all be used interchangeably herein. Likewise, the term "row" in a relational model could be equated with an object that is within a collection of objects in an object model. Likewise, the term "attribute" in a relational model could be equated with a member function or data member in an object model. The word "entity" or "element" is used generically in the context of both relational and object-oriented systems. It should be noted that because the models are different, there is not necessarily an exact correlation between the two. Likewise there are many different object models so the correlation between relational and object models must be quite flexible and should be loosely defined.

Quantifier: A quantifier is an identifier for qualifiers, aliases, tables, and views participating in queries. There is a quantifier for each qualifier, alias, table name, and view name participating in a query. The quantifier is defined in the FROM clause of a SQL query.

Nest Aggregate Function: The NEST aggregate function returns a collection of pointers to objects whose type is that of the function parameter. If the NEST function is applied to the empty set, it returns an empty collection. The function is applied to the set of values derived from the argument values by the elimination of null values.

Nest Subquery: A nest subquery is a nest aggregate function that is contained in a subquery of a query.

View: A view is an example of a virtual table (or a virtual collection of queryable objects). That is, it is generally not physically materialized anywhere until it is needed, such as when an SQL statement references it, for example. The metadata about the view (including the name of the view, the names and data types of each column and the way in which the rows are to be derived) is stored persistently in the database's metadata, but the actual data that a user can see in the view are not physically stored anywhere in association with the derived table. Rather, the data are stored in base tables (persistent base tables in SQL) from which the view's rows are derived.

Predicate: The most important relational operation is selection, i.e., identifying a specific row(s) in a table. Selection is typically accomplished by specifying one or more predicates that are used to filter a table to identify the rows for which the predicate is true. Essentially, a predicate is a question asked about the truth of something, or a statement about the truth. The value of a predicate is normally either true or false, though it can sometimes be unknown because insufficient information is available to determine the answer reliably.

Projection list (or select list): The select-list specifies the query's results. The select-list comes in two forms: one can either use just an asterisk: * meaning "all columns that are part of the table corresponding to the table-expression;" or one can use select-sublist [, select-sublist] . . . In this case, a select-sublist is either a derived-column or a qualifier followed by a period and an asterisk: t.*. (In OOSQL, as discussed and described below, a select-sublist can also include a qualifier: t).

The above terminology and other terminology used herein is intended to be used and interpreted in a manner consistent with the terminology as found in "*Understanding the New SQL: A Complete Guide,*" Jim Melton, Morgan Kaufmann, 1993, and as correspondingly applicable to object-oriented systems.

The preferred embodiment of this invention is incorporated into OOSQL, an Object-Oriented Query Service which provides SQL based query access to C++ programming language environments, Object-Oriented Systems (OOSs) (such as VAC++, SOM, and SOM 400) and Object-Oriented Database Systems (OODBs). In contrast to the ObjectStore, O2, and ODMG-93 query interfaces, the present invention is embodied in an OODB query interface that provides an upward compatible extension to SQL-92 (ISO__ANSI. Database Language SQL ISO/IEC 9075:1992, 1991). This enables programmers familiar with SQL to write OODB queries without learning an entirely new language. They simply learn about the object extensions. Also, this enables the many tools that have been built for relational systems to access OODB data via interfaces such as ODBC. (Microsoft. *Programmer's Reference, Microsoft Open Database Connectivity Software Development Kit,* 1992.)

In relational database management systems (DBMSs) using the SQL-92 query language, columns are of simple atomic types, and columns appear in queries as c or q.c where c is a column of some table and q is a correlation name (i.e., a range variable) defined over a table. In query languages for Object-Oriented DBMSs, column expressions are replaced with path expressions that allow traversal through pointers, embedded classes, structs, multi-valued collections, and relationships to reach nested data members. The SQL3 draft (See *Understanding the New SQL: A Complete Guide*; Jim Melton and Alan R. Simon; Morgan-Kaufmann Publishers, Inc., 1993; See also, ISO-ANSI Working Draft: Database Language SQL (SQL3), Jim Melton, editor; ISO/IEC SC21 WG3 DBL YOW-004 and ANSI X#H2-94-084. ISO__ANSI, 1995) proposes traversal through embedded Abstract Data Types (ADT). The ".." characters are used to express traversal through embedded types. For example, if address is an ADT of type Address, then e.address..zip expresses the traversal through the Address structure to obtain the data member zip.

A path expression is $q.m_1..m_2..,...,..m_n$ where q is a correlation name defined over a collection C, and $m_1$ is a member of the class of instances of C, and $m_i$ is a member of the class of $m_{i-1}$. A member $m_i$ can be a data member or a method. A path expression evaluates to the value of the leaf of the expression. For example, in e.address..zip, address is a member of the class empClass and zip is a member of the class Address. The expression e.address..zip returns the value of zip.

An Object Query Service requires a view facility to provide alternate schemas of similar data for varying application requirements. Aside from this, OO views offer additional uses for the interoperability of database applications and systems as follows:

OO views can present a flat representation of complex, nested OO data. This is useful in leveraging tools and applications that have been built for relational DBMSs. It is also useful for users who are familiar with the SQL query language and the relational model, and do not want to learn a new query language and data model; and OO views can be used to present an Object-Oriented view of legacy relational data. Such views can exploit the rich type structures of OO models, and define schemas that have multi-valued members using "collection" data types. Collections are aggregate data types that can store one or more elements of a given type.

The invention disclosed herein is concerned with OO views of OO data and of legacy relational data. More specifically, the invention is concerned with OO views having multi-valued members that are computed in the body of the view.

Implementation With Respect to OO Views of OO Data

Figure 1:
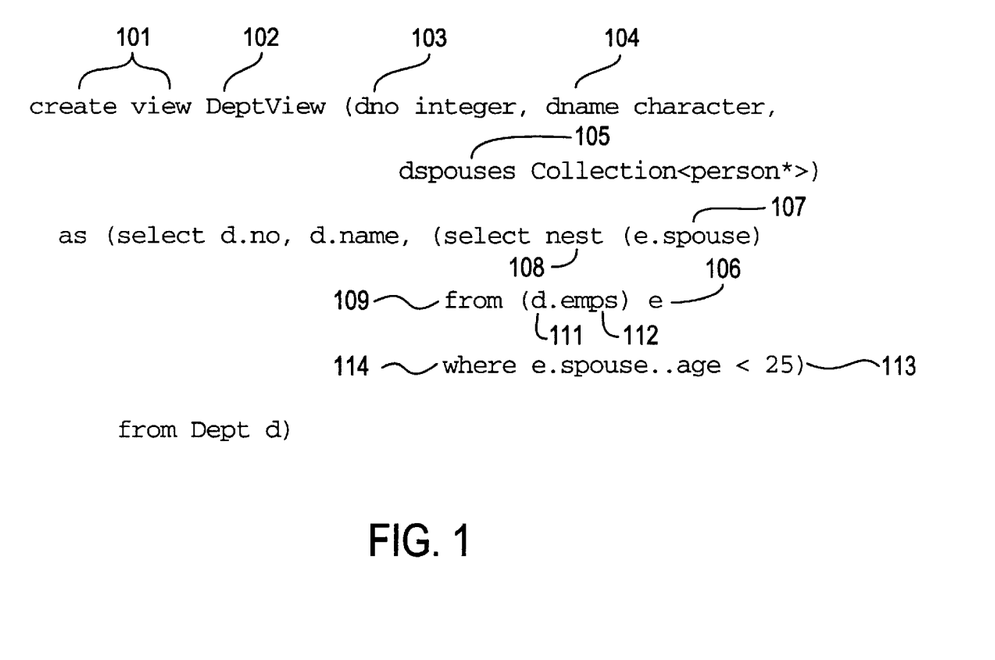
FIG. 1 is a sample OO View with a multi-valued data member illustrating the problem solved by this invention.

Shown below, and in FIG. 1, is a sample OO view with a multi-valued data member which illustrates the problem solved by this invention.

```
create view DeptView (dno integer, dname character,
            dspouses Collection<person*>)
as (select d.no, d.name, (select nest (e.spouse)
        from (d.emps) e
        where e.spouse . . . age < 25)
    from Dept d)
```

The create view command 101 shown in FIG. 1 defines the DeptView collection 102 that models a department with the set of young spouses of employees in that department. This command is similar to the "create view" command found in relational DBMSs. The DeptView collection is a virtual collection (or view) that defines the members dno integer 103, dname character 104, dspouses Collection<person*>105 as its schema. The member dno 103 is the department's number, the member dname 104 is the department name, and the member dspouses 105 is the collection of employees' young spouses for employees in a given department. The view DeptView 102 draws its instances from the collection Dept, which is a collection of departments having members no, name, emps which are the department's number, the department's name and the collection of employees in the department respectively.

The following describes the body, or implementation, of the view DeptView 102. Similarly to relational views, the body of an OO view is a query. The language being used is called OOSQL, and it is based upon the SQL query language with object-oriented extensions. OOSQL is described further in "Extending SQL-92 for OODB Access: Design and Implementation Experience," Jerry Kiernan and Mike Carey; In *Proc. Conference on Object-Oriented Programming Systems, Languages, and Applications*, Austin, Tex., October, 1995.

The query in the sample view of FIG. 1 has three projection elements that correspond to the three columns of the view type. The columns that correspond to the first two projection elements are department number 103 and department name 104. The column that corresponds to the third element 105 defines the set of young spouses in a department, i.e., the value for column dspouses. The third element is a correlated subquery that declares the correlation name e 106 that is bound to the nested set of employees emps 112 in department d 111. The projection element of the subquery, nest (e.spouse) 107, uses the aggregate operator nest 108 to form a collection of elements of type person from the spouse data member of employee. Since the subquery has no group by clause, the nest operator is applied to the set of bindings for e. Hence, the correlated subquery computes the set of young spouses for each department d.

Example 1

Find the Set of Departments d In Collection DeptView

```
select v.dno
from   DeptView v
```

Example 2

Find the Collections of Young Spouses In Collection DeptView

```
select v.dspouses
from   Deptview v
```

Example 3

Find the Names of the Young Spouses In Collection DeptView

```
select s.name
from   Deptview,v, (v.dspouses) s
```

The queries given in Examples 1, 2, and 3 above are over the DeptView view. While simple, these queries are intended to illustrate the class of queries affected by the rewrite transformation of this invention.

The query in Example 1 does not reference the nested collection dspouses. Similarly to any other unreferenced column, the subquery that implements the nested column dspouses is simply dropped (i.e., disregarded or eliminated) by the query rewrite transformation.

The query in Example 2 references the dspouses column in the projection list. This implies that the nested set is to be part of the result of the query, and therefore must be computed. Hence, rewrite transformations do not remove the computation of the subquery that implements the nested column.

The query in Example 3 represents the class of queries that are affected by the rewrite transformation presented in this disclosure. This query has a path expression that references the dspouses column, but the column is used in the from clause to define the correlation name s. The query given in Example 3 therefore unnests the nested set represented by dspouses.

The rewrite transformation of this invention eliminates the need to ever compute the nested set dspouses in order to resolve the query, thus resulting in a potentially significant performance gain. The transformed rewritten query is further processed independently of, i.e., without performing, the nested collection computation.

The method steps and program algorithm of this invention for performing the query rewrite transformation for the class of queries that correspond to Example 3 is shown below and in FIG. 2.

Nest Elimination:

```
for each quantifier q in the FROM clause do
  begin
    if q is defined over a nested set that is part of a view do
    begin
      if q is implemented by a subquery that projects a NEST
         aggregate
      begin
        (1) set the column to which q is bound to the argument
            of the NEST aggregate
        (2) add a null testing predicate to eliminate instances
            of the set that would otherwise be bound
to null                          values
        (3) add the quantifiers defined within the nest subquery
            to those of the query that is being rewritten
        (4) add the predicates from the view's nest subquery
            to those of the query that is being rewritten
        (5) rewrite all expressions that involve quantifiers
            over instances into path expressions (these are
            quantifiers that currently range over single objects
            instead of collections of objects)
      end
    end
  end
```

COPYRIGHT IBM CORPORATION 1996

The above method and program steps are described more fully as follows. The first line 201 of the algorithm is a "for" loop that iterates through the set of quantifiers in the query. There is a quantifier for each collection that participates in a query. A quantifier can range over a collection, a nested collection, a correlation name, or a view. The first "if" statement 203 selects quantifiers that are over nested sets defined in view types. The correlation name s in Example 3 qualifies as such a quantifier. The next "if" statement 205 determines if the column is implemented using a subquery with the nest aggregate operator. In the definition of such views, subqueries that implement nested sets are not allowed to have a group by or having clause. For example, the subquery in FIG. 1 has no such clause. The prohibition of the group by clause guarantees that the subquery returns at most one set; this is required for correctness since the subquery appears in a select clause and therefore must produce a singleton result. The prohibition of the having clause enables the transformations described here to be applied. An alternative embodiment would permit having clauses, but would disable the nest elimination transformations in cases where they appear.

Figure 2:
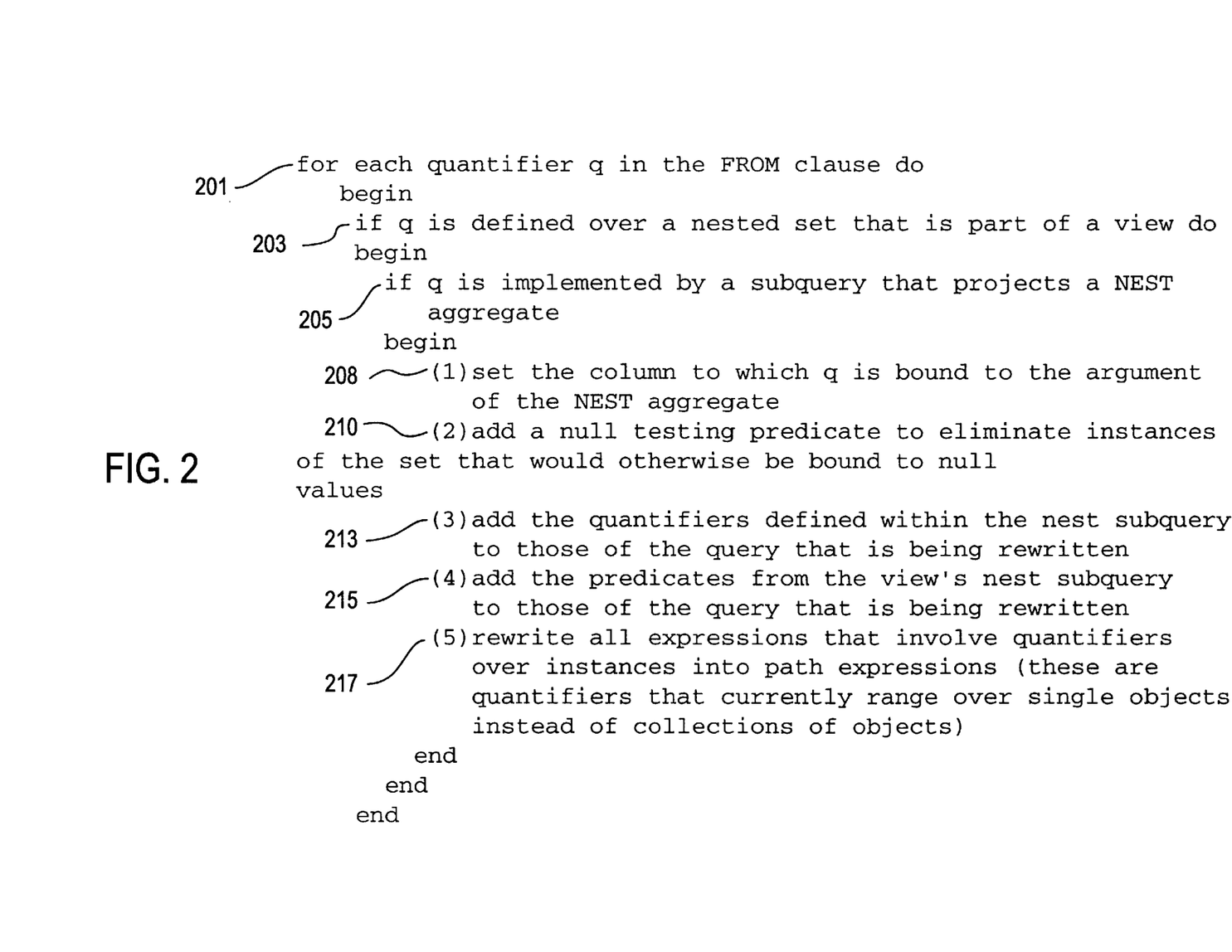
FIG. 2 is pseudo code illustrating the programming code for implementing the rewrite transformations.
Figure 3:
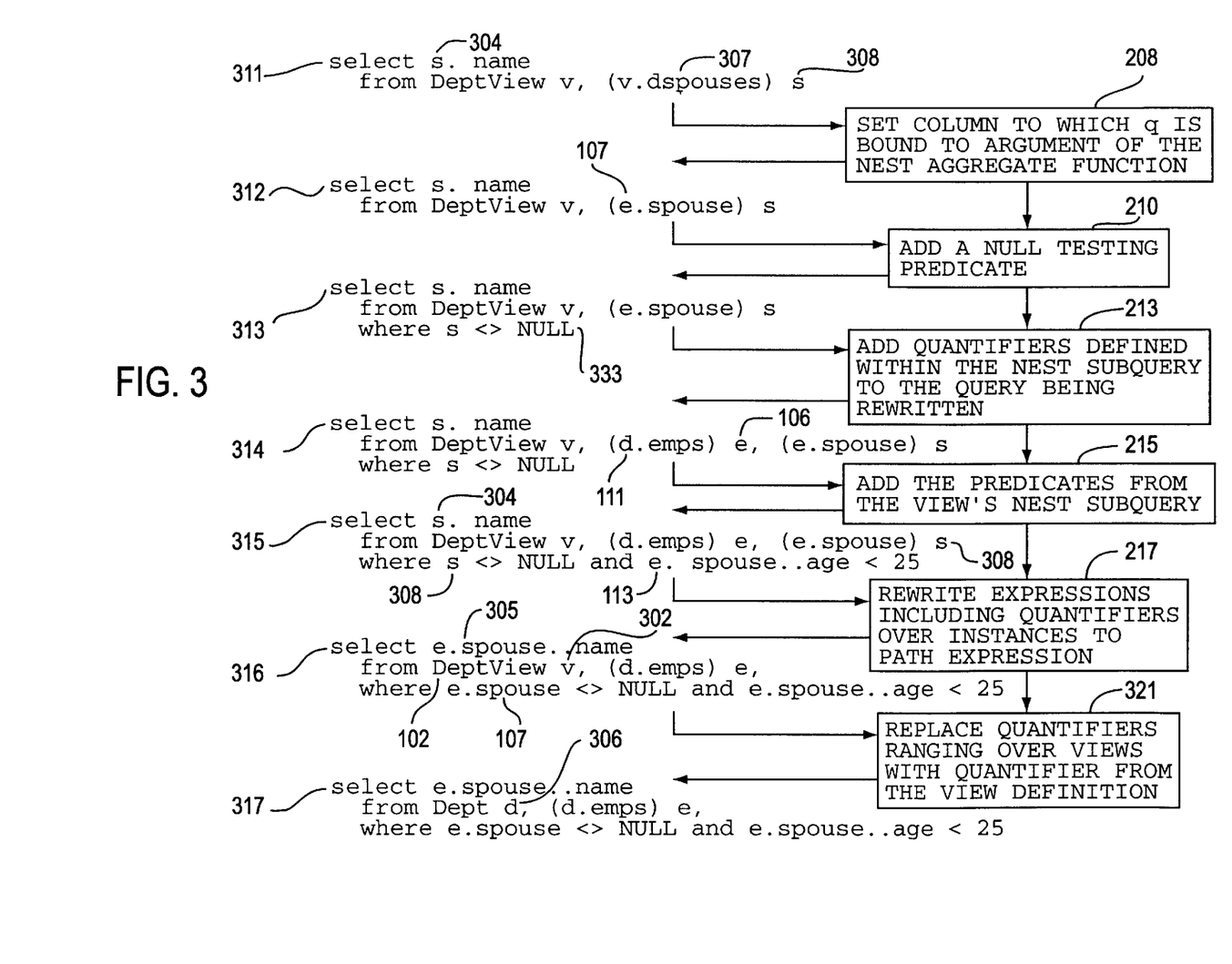
FIG. 3 is a flow chart illustrating the method and program steps of the invention with a sample illustration of a rewritten query after each step.

The following steps of nest elimination are shown in FIG. 2 and in FIG. 3. FIG. 3 illustrates the effects of each step on the query in Example 3 shown above and in FIG. 3 as element 311.

Step (1) 208 (FIGS. 2 & 3) of nest elimination requires resetting the column (i.e., element) 307 (FIG. 3) to which the quantifier q (s, 308) is bound to the argument 107 (FIG. 1) of the nest aggregate function 108 (FIG. 1) that is the projection element of the subquery. For example, the correlation name s 308 (FIG. 3) in Example 3 is reset to be e.spouse 107 (FIG. 3), the argument of the nest aggregate in the OO sample view shown above and in FIG. 1.

```
select s.name
from   DeptView v, (e.spouse) s
```

Note that e.spouse 107 is not a set; therefore, s is now a correlation name that is bound to a single object instance. Note also that the correlation name e is temporarily undefined; this will be corrected by step (3) of the nest elimination process.

Step (2) 210 (FIGS. 2 & 3) adds a null testing predicate 333 (FIG. 3) to guarantee that the rewritten query is equivalent to the original one with respect to null values. The nest aggregate operator does not include null instances in the sets of objects that it forms. Other aggregate operators have similar semantics with respect to nulls. In the ongoing example, the predicate s <> NULL 333 (FIG. 3) is now added to the set of predicates in the transformation of the above query:

```
select s.name
from   DeptView v, (e.spouse) s
where  s <> NULL
```

Note that the addition of such predicates will also guarantee the non-nullness of any intermediate nodes in the path expressions that are introduced later, in step (5); this is because a predicate value is defined to be UNKNOWN if it involves a path expression that traverses through a null pointer.

Step (3) 213 (FIGS. 2 & 3) adds the contents 111, 112, 106 (FIG. 1) of the from clause 109 (FIG. 1) of the view's nest subquery to that of the query:

```
select s.name
from   DeptView v, (d.emps) e, (e.spouse) s
where  s <> NULL
```

Note that the correlation name e 106 (FIG. 3) is now defined, but that the newly introduced correlation name d 111 (FIG. 3) is undefined. This will be corrected later, when the from-clause element DeptView v is replaced by its underlying view definition (Dept d) during subsequent view rewrite processing.

Step (4) 215 (FIGS. 2 & 3) now adds the contents 113 (FIG. 1) of the where clause 114 (FIG. 1) of the view's nest subquery to that of the query:

```
select s.name
from   DeptView v, (d.emps) e, (e.spouse) s
where  s <> NULL and e.spouse..age < 25
```

Step (5) 217 (FIGS. 2 & 3) addresses the remaining problem of resetting quantifiers that range over instances instead of collections. (This transformation also applies to other cases besides nest elimination. For example, a view that is defined in terms of other views can also lead to the introduction of instance quantifiers that need to be eliminated in this way.) Correlation s 308 (FIG. 3) above is an example of such a quantifier since it ranges over e.spouse, which is not a set. Step (5) eliminates s 308 from the query, and transforms all expressions involving s into corresponding path expressions:

```
select e.spouse..name
from   DeptView v, (d.emps) e
where  e.spouse <> NULL and e.spouse..age < 25
```

For example, step (5) 217 (FIG. 2 & 3) has converted the expression s.name 304 (FIG. 3) in the query into the path expression e.spouse..name 305; likewise, s 308 has been replaced by e.spouse 107 in the NULL-testing predicate.

The final step 321 (FIG. 3) of the query transformation process, which is not part of the nest elimination procedure of FIG. 2, is to carry out the remainder of the usual view rewrites (i.e., those that are not specific to nest elimination). These rewrites involve identifying all quantifiers in the query that range over views. Each such quantifier ranging over a view is replaced by the quantifiers from the associated view definition, and uses of view quantifiers are appropriately replaced as well. Having performed this step, the quantifier ranging over the view in this example is eliminated from the query, i.e., the quantifier v 302 (FIG. 3) ranging over view DeptView 102 (FIG. 3) is replaced by the quantifier d 306 (FIG. 3) ranging over the collection Dept (as defined in the view DeptView, FIG. 1). The fully rewritten result query 317 (FIG. 3) is thus:

```
select e.spouse..name
from   Dept d, (d.emps) e
where  e.spouse <> NULL and e.spouse..age < 25
```

Implementation With Respect to OO Views of Relational Data

Shown below is an example of the above method steps and program algorithm of this invention with respect to OO views of relational data. The following is a sample view:

```
create view DeptView (dno integer, dname character,
    dspouses
    Collection<person*>)
as (select d.no, d.name, (select nest (p)
    from Emp e, People p where e.spouse = p.id and
    e.did = d.no and p.age < 25)
from Dept d)
```

A sample query is:

```
select s.name
from DeptView v, (v.dspouses) s
```

The first step in rewriting the query sets the column to which the quantifier is bound to the argument of the nest aggregate function.

As a result, the query becomes:

```
select s.name
from DeptView v, (p) s
```

The second step adds a null testing predicate to eliminate instances of the set that would otherwise be bound to null values.

```
select s.name
from DeptView v, (p) s
where s<> NULL
```

The third step adds the quantifiers defined within the nest subquery to those of the query that is being rewritten.

```
select s.name
from DeptView v, Emp e, People p, (p) s
where s<> NULL
```

The fourth step adds the predicates from the view's nest subquery to those of the query that is being rewritten.

```
select s.name
from DeptView v, Emp e, People p, (p) s
where s<> NULL and e.spouse = p.id and e.did = d.no and p.age< 25
```

The fifth step rewrites all expressions that involve quantifiers over instances to quantifiers over a collection.

```
select p.name
from DeptView v, Emp e, People p
where p<> NULL and e.spouse = p.id and e.did = d.no and p.age< 25
```

A final step carries out the remainder of the typical view rewrite transformations such as replacing each quantifier ranging over a view with the quantifiers from the associated view definition.

```
select p.name
from Dept d, Emp e, People p
where p<> NULL and e.spouse = p.id and e.did = d.no and p.age< 25
```

Query Processing System

An OO-SQL query processing system is described with reference to FIGS. 4A and 4B. A preferred embodiment has an implementation of OO-SQL that runs on top of SOM 412. SOM, which indicates System Object Model, is well known in the art as an object architecture. It is described fully in *Object Oriented Programming Using SOM and DSOM*, Lau, Christina, Van Nostrand Reinhold, an International Thomson Publishing Company, 1994. In addition, OO-SQL can run on top of an Object-Store OODB system.

Figure 4A:
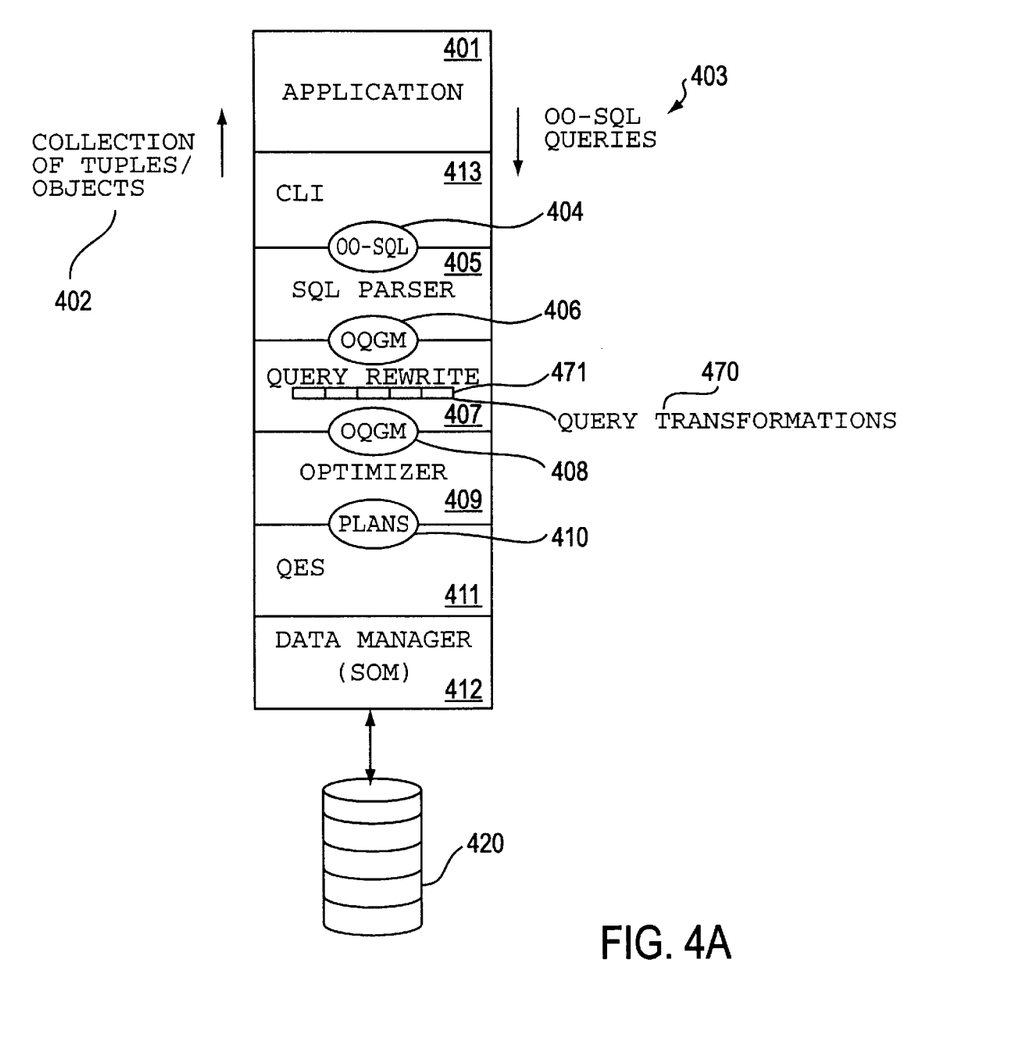
FIGS. 4A and 4B are functional block diagrams of the system incorporating the invention.

FIG. 4A presents the framework for the implementation which supports the integration of the OO-SQL engine with users' applications 401. The application 401 issues SQL queries 403 through a Call Level Interface (CLI) 413. The SQL parser component 405 parses the query and generates an internal representation of the query called a query graph, i.e. a data structure OQGM (object query graph model) 406. The OQGM 406 is passed to the query rewrite component 407. The query rewrite engine 407 applies transformations to collapse the query. These query rewrite transformations 470 include the standard relational query rewrite techniques that were developed for relational systems and the query rewrite transformation 471 of this invention. The query rewrite transformation 471 of this invention is used for the class of queries that unnest a nested collection. After the rewrite phase, 407, the result is a query graph 408 that is used by the optimization phase 409. Each query is then translated into an executable plan 410. Once translated, a query plan (QPL) 410 is passed to the Query Evaluation Subsystem, (QES) 411, which runs it against SOM collections of objects. Returned to the application 401 (which could also be a user interacting directly through an interface) is an ordered collection of tuples or objects 402. Query results can include pointers to objects in stored collections. These pointers are simply virtual memory addresses in an application program, so they must be valid pointers in the application program's workspace in order to be useable for further C++ based navigation and data manipulation.

Figure 4B:
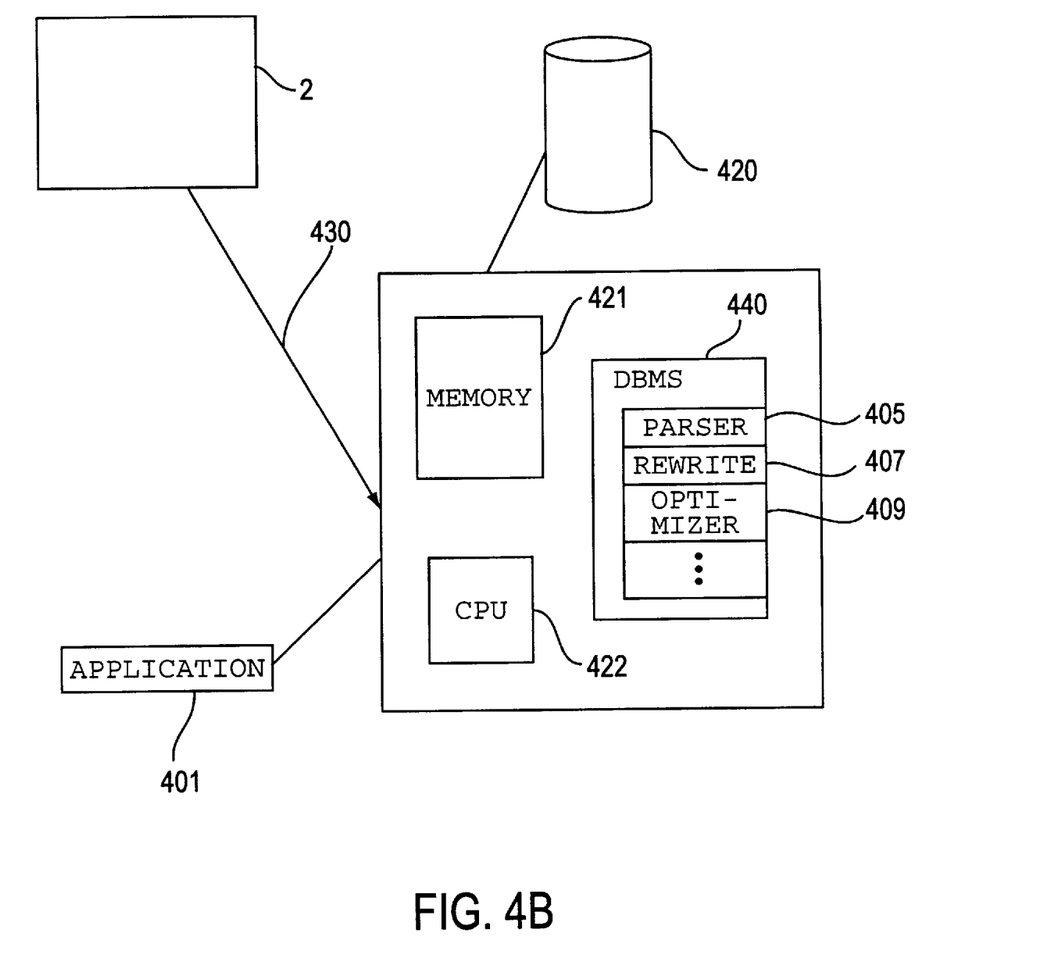

FIG. 4B shows the context of the query rewrite engine 407 in a database management system (DBMS) 440 in a processing system 1 having memory 421 and at least one cpu 422. The system 1 could be connected to other systems 2 via a network 430. The application 401 could be resident on any of the systems 1, 2, in the network.

The present invention was developed in the context of an Object Query Service. However, the invention could also be incorporated into a query service for relational systems. For definitional purposes herein, the term "element" may refer to a column/row of a relational system or an object of an object-oriented system.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, cpu, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

We claim:

1. A method, in a computer system, for processing a query, the method comprising:
    transforming the query into a rewritten query that eliminates a need for a nested collection computation if the query is over an object-oriented view containing a collection and the query unnests the nested collection; and
    processing the rewritten query independently of performing the nested collection computation.

2. A method of processing a database query by a database management system, the method comprising:
    rewriting the database query into a rewritten database query by performing the following steps—
        resetting an element to which a quantifier is bound in the database query to an argument of a nest aggregate function in a nest subquery of a view; and
        adding quantifiers defined within the nest subquery to the rewritten database query; and
    processing the rewritten database query.

3. The method of claim 2 wherein rewriting the database query further comprises adding a null testing predicate to the rewritten database query.

4. The method of claim 2 wherein rewriting the database query further comprises adding predicates from the nest subquery of the view to the rewritten database query.

5. The method of claim 2 wherein rewriting the database query further comprises rewriting each expression involving a quantifier over an instance into a path expression.

6. A method of processing a database query by a database management system, the method comprising:
    rewriting the database query into a rewritten database query by performing the following steps—
        resetting an element to which a quantifier is bound in the database query to an argument of a nest aggregate function in a nest subquery of a view;
        adding a null testing predicate to the rewritten database query;
        adding quantifiers defined within the nest subquery to the rewritten database query;
        adding predicates from the nest subquery of the view to the rewritten database query; and
        rewriting each expression involving a quantifier over an instance into a path expression; and
    processing the rewritten database query.

7. The method of claim 2 or 6 wherein rewriting the database query further comprises replacing quantifiers ranging over views with a quantifier from a definition of the view.

8. The method of claims 2, 3, 4, 5 or 6 wherein the steps for rewriting the database query are performed for each quantifier in the database query if the quantifier is over a nested set defined in a view type or if the quantifier is implemented by a subquery using the nest aggregate function.

9. A computer program, on a computer usable medium, for rewriting a database query, the program comprising:
    program code means for causing a transformation of the query into a rewritten query that eliminates a need for a nested collection computation if the query is over an object-oriented view containing a collection and the query unnests the nested collection; and
    program code means for causing the rewritten query to be further processed independently of performing the nested collection computation.

10. A computer program, on a computer usable medium, for rewriting a database query, the program comprising:
    program code means for causing a resetting of an element to which a quantifier is bound in the database query to an argument of a nest aggregate function in a nest subquery of a view; and program code means for causing an adding of quantifiers defined within the nest subquery to a rewritten database query.

11. The program of claim 10 further comprising program code means for causing an adding of a null testing predicate to the rewritten database query.

12. The program of claim 10 further comprising program code means for causing an adding of predicates from the nest subquery of the view to the rewritten database query.

13. The program of claim 10 further comprising program code means for causing a rewriting of each expression involving a quantifier over an instance into a path expression.

14. A computer program, on a computer usable medium for rewriting a database query, the program comprising:
    program code means for causing a resetting of an element to which a quantifier is bound in the database query to an argument of a nest aggregate function in a nest subquery of a view;
    program code means for causing an adding of a null testing predicate to a rewritten database query;
    program code means for causing an adding of quantifiers defined within the nest subquery to the rewritten database query;
    program code means for causing an adding of predicates from the nest subquery of the view to the rewritten database query; and
    program code means for causing a rewriting of each expression involving a quantifier over an instance into a path expression.

15. The program of claim 10 or 14 further comprising program code means for causing a replacing of quantifiers ranging over views with a quantifier from a definition of the view.

16. The program of claim 10, 11, 12, 13 or 14 wherein the program code means are activated for each quantifier in the database query if the quantifier is over a nested set defined in a view type or if the quantifier is implemented by a subquery using the nest aggregate function.

17. A system for processing a database query, the system comprising:
    means for transforming the query into a rewritten query that eliminates a need for a nested collection computation if the query is over an object-oriented view containing a collection and the query unnests the nested collection; and
    means for processing the rewritten query independently of performing the nested collection computation.

18. A system for processing a database query, the system comprising:
    means for rewriting the database query into a rewritten database query, the means for rewriting having
        means for resetting an element to which a quantifier is bound in the database query to an argument of a nest aggregate function in a nest subquery of a view; and
        means for adding quantifiers defined within the nest subquery to the rewritten database query; and
    means for processing the rewritten database query.

19. The system of claim 18 wherein the means for rewriting the database query further comprises means for adding a null testing predicate to the rewritten database query.

20. The system of claim 18 wherein the means for rewriting the database query further comprises means for adding predicates from the nest subquery of the view to the rewritten database query.

21. The system of claim 18 wherein the means for rewriting the database query further comprises means for rewriting each expression involving a quantifier over an instance into a path expression.

22. A system for processing a database query, the system comprising:
    means for rewriting the database query into a rewritten database query, the means for rewriting having
        means for resetting an element to which a quantifier is bound in the database query to an argument of a nest aggregate function in a nest subquery of a view;
        means for adding a null testing predicate to the rewritten database query;
        means for adding quantifiers defined within the nest subquery to the rewritten database query;
        means for adding predicates from the nest subquery of the view to the rewritten database query; and
        means for rewriting each expression involving a quantifier over an instance into a path expression; and
    means for processing the rewritten database query.

23. The system of claim 18 or 22 wherein the means for rewriting the database query further comprises means for replacing quantifiers ranging over views with a quantifier from a definition of the view.

24. A query rewrite engine in a database management system, the query rewrite engine comprising:
    means for disregarding a subquery that implements a nested element if a query does not reference the nested element;
    means for computing a nested set it the query references the nested element in the projection list and the nested set is to be a part of a result of the query; and
    means for rewriting the query if the query unnests the nested set, wherein the means for rewriting further comprises means for resetting an element to which a quantifier is bound in the query to an argument of a nest aggregate function in a nest subquery of a view, and adding quantifiers defined within the nest subquery to a rewritten database query.

25. A method of processing a database query in a database management system, the method comprising:
    disregarding a subquery that implements a nested element if a query does not reference the nested element;
    computing a nested set if the query references the nested element in the projection list and the nested set is to be a part of a result of the query; and
    rewriting the query if the query unnests the nested set, wherein the step of rewriting further comprises resetting an element to which a quantifier is bound in the query to an argument of a nest aggregate function in a nest subquery of a view, and adding quantifiers defined within the nest subquery to a rewritten database query.

* * * * *

UNITED STATES PATENT AND TRADEMARK OFFICE
CERTIFICATE OF CORRECTION

PATENT NO. : 6,006,214

DATED : December 21, 1999

INVENTOR(S) : Michael J. Carey and Gerald George Kiernan

It is certified that error appears in the above-identified patent and that said Letters Patent is hereby corrected as shown below: On the title page: Item [56]

1st Column, OTHER PUBLICATIONS, 1st entry, 2nd line, "o fteh" should read --of the--.

Column 8, line 32, "Deptview,v," should read --Deptview v,--.

Column 16, line 37, "it the" should read --if the--.

Signed and Sealed this

Fifteenth Day of May, 2001

Attest:

NICHOLAS P. GODICI

Attesting Officer

Acting Director of the United States Patent and Trademark Office